Nov. 13, 1934.  J. W. BURLEIGH  1,980,165
POWER TRANSMISSION SYSTEM
Filed Nov. 5, 1931    2 Sheets-Sheet 1
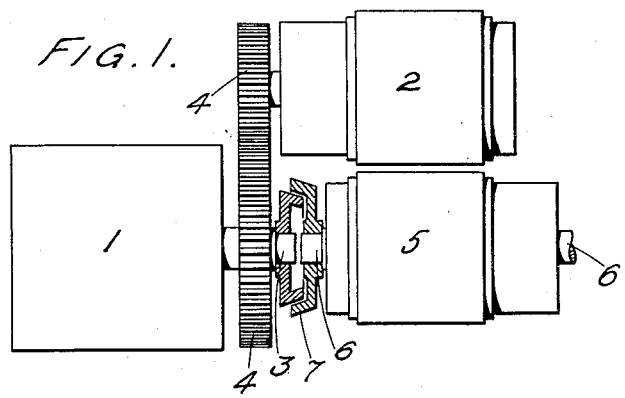
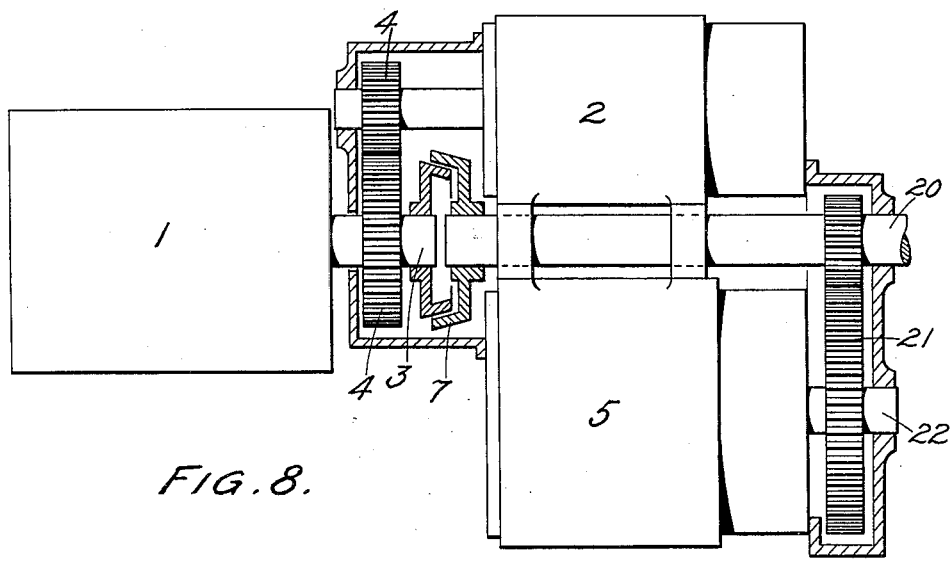
Inventor,
John Wesley Burleigh
Per,
Wm. L. Symons Atty.

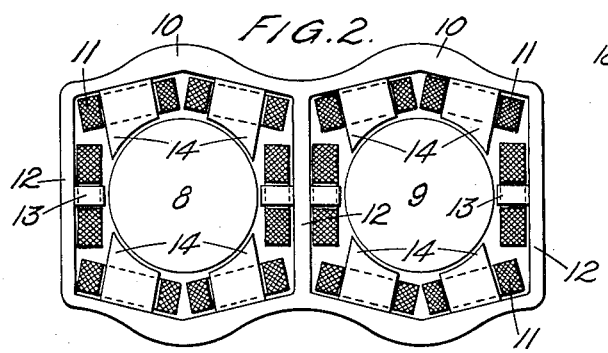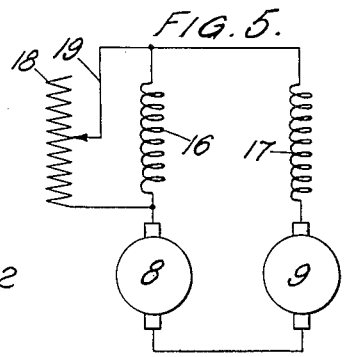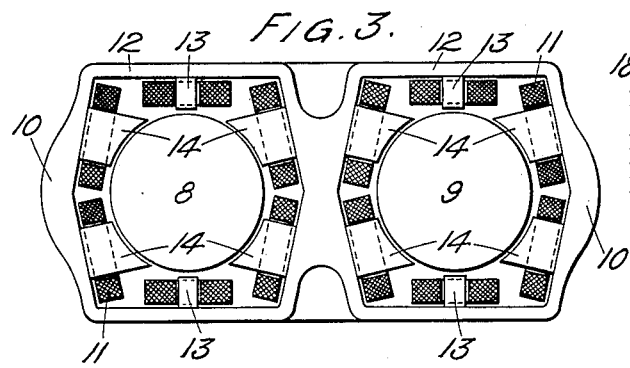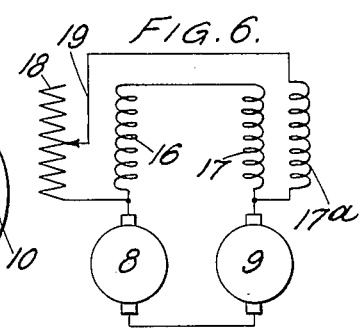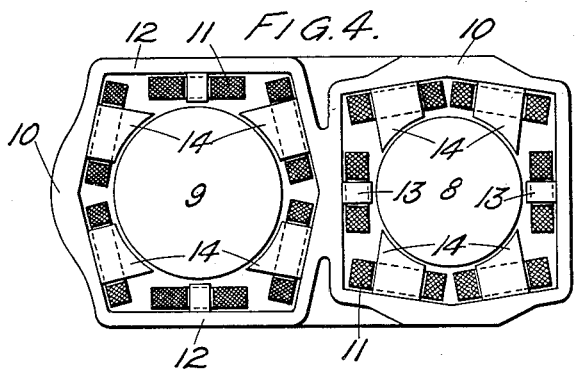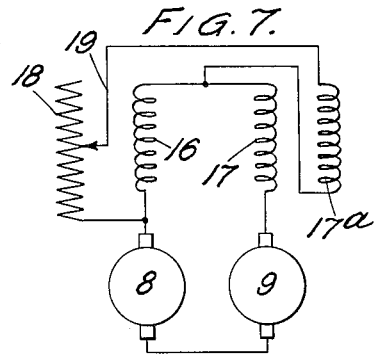

Patented Nov. 13, 1934

1,980,165

UNITED STATES PATENT OFFICE 1,980,165

POWER TRANSMISSION SYSTEM

John Wesley Burleigh, Pasadena, Calif.

Application November 5, 1931, Serial No. 573,207
In Great Britain December 6, 1930

5 Claims. (Cl. 290—14)

This invention relates to improvements in power transmission systems for motor propelled vehicles and has relation in particular, but not exclusively, to road vehicles in which the energy developed by a prime mover, such as an internal combustion engine, is converted in a direct current dynamo into electrical energy which is transformed by an electric motor into mechanical energy and applied to the road wheels.

One object of the invention is to provide a simply controlled transmission system which is compactly disposed, more particularly by decreasing the total length occupied. Other objects will be pointed out in the specification.

Various embodiments of the invention as applied to vehicle propulsion are illustrated, by way of example only, in the accompanying drawings, in which:—

Fig. 1 is a plan view illustrating one disposition of the components,

Figs. 2, 3 and 4 are end elevations of various unitary dynamo and motor structures, Figs. 5, 6 and 7 are circuit diagrams illustrating examples of diverter control, and Fig. 8 is a plan view illustrating another arrangement of the components.

In Fig. 1, 1 is a prime mover, such as an internal combustion engine, of any suitable type and construction. 2 is a direct current dynamo which is driven from the prime mover shaft 3 by gearing such as spur gearing 4 or a chain. 5 is an electric motor the shaft 6 of which is connected to the mechanism for driving the road wheels.

In some applications of the invention it is desirable to provide a clutch or coupling 7 to enable the prime mover shaft 3 and the motor shaft 6 to be directly coupled for the purpose of permitting the whole of the energy of the prime mover (with the exception of certain frictional and windage losses in the dynamo and the electric motor) to be delivered to the shaft 6. The clutch 7 is shown as a mechanical one, but no particular construction of clutch or method of operating or controlling the same is essential.

The longitudinal axis of the dynamo is always disposed parallel to and side by side with that of the electric motor although not necessarily at the same level.

The dynamo and motor frames may be cast or bolted together to form one structure or casing. In this case the machines may be of the ordinary radial pole type of construction and design. It is preferred, however, to use a construction such as is shown in Fig. 2 wherein 8 and 9 are the respective armatures of the dynamo and electric motor, 10 horseshoe magnets excited by coils 11, and 12 yokes connecting the horseshoe magnets and carrying interpoles 13.

Figs. 3 and 4 show two variations in the disposal of the main poles 14 and the interpoles 13. Machines having six or more poles may be constructed having horse-shoe magnets like the four-pole constructions shown. By combining the magnet frames of the dynamo and motor to form one structure or casing, the suspension in the chassis is facilitated and there is a saving in weight as compared with two separate machines.

Figs. 5, 6 and 7 are circuit diagrams showing some examples of diverter control. 16 is the series field winding of the dynamo and 17 the series field winding of the motor. 18 is a diverter resistance which is variable by means of an adjustable contact 19. In Figs. 6 and 7 instead of a connection being made (Fig. 5) from the adjustable contact 19 to one end of the series field 16 of the dynamo it is connected to one end of a separate series winding 17a on the motor, the other end of which winding is connected to one or other end of the motor winding 17. Naturally other methods of diverter control may also be used. For the sake of clearness, the usual braking, reversing and like connections are not shown. In practice these may be embodied in a suitable controller.

To start the vehicle with the arrangement of Fig. 5, the movable contact 19, which is in the lowermost position short circuiting the series field 16 of the dynamo, is moved until the dynamo generates a low voltage sufficient to overcome the ohmic resistance of the dynamo and motor windings and to permit the flow of the requisite current (of which a portion flows through the series windings 16 of the dynamo and a portion through the diverter resistance 18) to enable the motor to exert the necessary starting torque. Further increase in the speed of the motor is obtained by moving the contact 19 further upwards. When it is in the uppermost position, the contact 19 may be out of contact with the resistance 18, so that all the current generated passes through the series field coils 16 of the dynamo. To increase still further the speed of the motor it is necessary either to increase the engine speed and thereby generate a higher voltage or to place resistance in parallel with the motor field coils in order to lessen the magnetic flux of the motor. If a clutch or coupling is embodied in the system it can be thrown into action when the engine and the motor speeds are the same, or nearly the same.

In some cases when the clutch is in action and the prime mover is driving directly, the higher road speeds may be difficult to obtain without running the engine at unduly high speeds. In such a case it will be well to declutch and revert to the electric drive.

The provision of series wound or predominatingly series wound field magnets for the dynamo of an electro-mechanical transmission system such as herein described results in great advantages. The vehicle is always moving when the clutch is in action, therefore it is of the greatest importance that the dynamo should, in the quickest possible time, generate a suitable voltage and current for the electro-motor to enable it to "pick up" the load which is thrown off at the moment of declutching. In other words, the interval of time between the withdrawal of the engine power when used direct and the application of the power from the electro-motor should be of the shortest possible duration. A series field winding has a low self induction and will therefore respond much more rapidly than one wound otherwise. A shunt dynamo would be sluggish in operation and difficult to "pick up" under load. Furthermore, if a dynamo with the latter class of winding is left with the coils excited when the engine is running direct to the mechanism of the road wheels, iron losses would result in the dynamo armature. There would also be a loss of energy in exciting the field coils. These combined losses would lower the efficiency of the transmission. Important advantages (particularly of simplified control of the motor) are obtained, even if a clutch is not provided.

In some cases, in order to reduce the weight of the electric motor, it may be preferred not to build the armature thereof on the transmission shaft (as in Fig. 1), but (Fig. 8) to place the electric motor 5 beside the transmission shaft 20 and to gear it thereto by, for example a pinion gear 21. The shaft 22 of the electric motor and the transmission shaft 20 are parallel with one another but are not necessarily disposed at the same level. As illustrated, the shaft 20 is in alignment with the shaft 3 of the prime mover 1 and can be directly coupled thereto by the clutch 7. In operation this arrangement is similar to those previously described.

What I claim is:—

1. A vehicle propulsion system, comprising a prime mover with a shaft, a series-wound dynamo having its shaft disposed parallel to and in side by side relation with the shaft of the prime mover, a driving connection between said shafts, an electric motor disposed parallel to and in side by side relation with the dynamo, a transmission shaft disposed parallel to and in side by side relation with the dynamo shaft, a driving connection between the motor armature and the transmission shaft, a clutch engageable between the shaft of the prime mover and the transmission shaft for coupling the same, and electrical connections between said dynamo and motor whereby the latter can be supplied with current from the former.

2. A vehicle propulsion system, comprising a prime mover with a shaft, a series-wound dynamo having its shaft disposed parallel to and in side by side relation with the shaft of the prime mover, a driving connection between said shafts, an electric motor having its shaft disposed parallel to and in side by side relation with the shafts of the dynamo and the prime mover, and electrical connections between said dynamo and motor whereby the latter can be supplied with current from the former.

3. A vehicle propulsion system, comprising a prime mover with a shaft, a series-wound dynamo having its shaft disposed parallel to and in side by side relation with the shaft of the prime mover, a driving connection between said shafts, an electric motor having its shaft disposed parallel to and in side by side relation with the shafts of the dynamo and the prime mover, a transmission shaft disposed parallel to and in side by side relation with the dynamo and motor shafts, a driving connection between the motor and transmission shafts, and electrical connections between said dynamo and motor whereby the latter can be supplied with current from the former.

4. A vehicle propulsion system, comprising a prime mover with a shaft, a series-wound dynamo having its shaft disposed parallel to and in side by side relation with the shaft of the prime mover, a driving connection between said shafts, an electric motor having its shaft disposed parallel to and in side by side relation with the shafts of the dynamo and the prime mover, a transmission shaft disposed in alignment with the shaft of the prime mover, a driving connection between the motor and transmission shafts, and electrical connections between said dynamo and motor whereby the latter can be supplied with current from the former.

5. A vehicle propulsion system, comprising a prime mover with a shaft, a series-wound dynamo having its shaft disposed parallel to and in side by side relation with the shaft of the prime mover, a driving connection between said shafts, an electric motor having its shaft disposed parallel to and in side by side relation with the shafts of the dynamo and the prime mover, a transmission shaft disposed in alignment with the shaft of the prime mover, a driving connection between the motor and transmission shafts, a clutch engageable between the adjacent ends of the aligned prime-mover and transmission shafts for directly coupling the same, and electrical connections between said dynamo and motor whereby the latter can be supplied with current from the former.

JOHN WESLEY BURLEIGH.